United States Patent [19]

Cowan et al.

[11] Patent Number: 5,301,752

[45] Date of Patent: Apr. 12, 1994

[54] DRILLING AND CEMENTING WITH PHOSPHATE-BLAST FURNACE SLAG

[75] Inventors: Kenneth M. Cowan, Sugar Land; Arthur H. Hale, Houston, both of Tex.

[73] Assignee: Shell Oil Company, Houston, Tex.

[21] Appl. No.: 964,799

[22] Filed: Oct. 22, 1992

[51] Int. Cl.$^5$ .................. E21B 33/138; E21B 33/14
[52] U.S. Cl. ................... 166/292; 106/690; 166/300; 175/65
[58] Field of Search .............. 166/292, 300; 106/690, 106/789, 790; 507/140; 175/64, 65

[56] References Cited

U.S. PATENT DOCUMENTS

| | | | |
|---|---|---|---|
| 2,336,723 | 12/1943 | Drummond | 106/76 |
| 2,649,160 | 8/1953 | Williams et al. | |
| 2,822,873 | 2/1958 | Harmsen et al. | 166/29 |
| 2,880,096 | 3/1959 | Hurley | |
| 2,895,301 | 7/1959 | Casagrande et al. | |
| 2,899,329 | 8/1959 | Lyons | 106/287 |
| 2,938,353 | 3/1960 | Vorenkamp | |
| 2,961,044 | 11/1960 | Shell | |
| 3,021,680 | 2/1962 | Hayward | |
| 3,077,740 | 2/1963 | Hemwall | 61/36 |
| 3,111,006 | 11/1963 | Caron | 61/36 |
| 3,168,139 | 2/1965 | Kennedy et al. | |
| 3,202,520 | 8/1965 | Enoch | 106/690 |
| 3,412,564 | 11/1968 | McClintock | |
| 3,499,491 | 3/1970 | Wyant et al. | |
| 3,557,876 | 1/1971 | Tragesser | |
| 3,670,832 | 6/1972 | Striegler | |
| 3,675,728 | 7/1972 | Faulk et al. | |
| 3,712,393 | 1/1973 | Sheldahl et al. | |
| 3,724,562 | 4/1973 | Striegler | |
| 3,820,611 | 6/1974 | King | |
| 3,835,939 | 9/1974 | McEntire | |
| 3,878,110 | 4/1975 | Miller et al. | 507/140 X |
| 3,887,009 | 6/1975 | Miller et al. | |
| 3,921,717 | 11/1975 | Danjushevsky et al. | 166/292 |
| 3,962,878 | 6/1976 | Hansen | |
| 3,964,921 | 6/1976 | Persinski et al. | 106/90 |
| 4,014,174 | 3/1977 | Mondshine | 61/53.52 |
| 4,037,424 | 7/1977 | Anders | |
| 4,057,116 | 11/1977 | Striegler | |
| 4,215,952 | 8/1980 | Baardsen | |

(List continued on next page.)

FOREIGN PATENT DOCUMENTS

| | | |
|---|---|---|
| 85-144069 | 7/1983 | Japan |
| 61-48454 | 3/1986 | Japan |
| 833-704 | 6/1981 | U.S.S.R. |

OTHER PUBLICATIONS

"Deep Cement Mixing Experience in Japan", by G. Dennis et al, Copyright 1985 Seabed Strengthening Symposium, Denver, Co., Jun. 4, 1985, TP 85-5.
"Mud Disposal: An Industry Perspective", Hanson et al, Drilling, May 1986, pp. 16–21.
"Waste Minimization Program Can Reduce Drilling Costs", Hall et al, Oryx Energy Co., Houston, Tex., Oil & Gas Journal, Jul. 11, 1991, pp. 43–46.
"Phosphoric Acids and Phosphates", Kirk-Othmer Enc. of Chemical Technology, 3rd Ed., vol. 17, p. 477.
"Conversion of Drilling Fluids to Cements with Blast Furnace Slag-Performance Properties and Applications for Well Cementing", SPE Paper 24575 (Oct. 4, 1992) by Cowan et al.
"Quantitative Interpretation of X-Ray Diffraction Patterns of Mixtures.I.Matrix-Flushing Method for Quantitative Multicomponent Analysis" by Frank H. Chung, J. Appl. Cryst. (1974) 7, pp. 519–525.

Primary Examiner—George A. Suchfield

[57] ABSTRACT

A drilling and cementing process wherein a drilling fluid containing a metal compound component is utilized and thereafter combined with a phosphorus acid to give a cementitious slurry which is thereafter used in a cementing operation. Blast furnace slag can be the source of the metal compound.

18 Claims, No Drawings

U.S. PATENT DOCUMENTS

| | | |
|---|---|---|
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. ............................ 106/76 |
| 4,460,292 | 7/1984 | Durham et al. . |
| 4,518,508 | 5/1985 | Conner ................. 210/751 |
| 4,643,617 | 2/1987 | Kanno et al. ......................... 405/222 |
| 4,664,843 | 5/1987 | Burba, III et al. . |
| 4,668,128 | 5/1987 | Hartley et al. . |
| 4,674,574 | 6/1987 | Savoly et al. ........................ 166/293 |
| 4,690,589 | 9/1987 | Owa ..................................... 405/263 |
| 4,692,065 | 9/1987 | Suzuki et al. ......................... 405/211 |
| 4,720,214 | 1/1988 | Brasted et al. . |
| 4,746,245 | 5/1988 | Mork ................................... 405/224 |
| 4,760,882 | 8/1988 | Novak . |
| 4,761,183 | 8/1988 | Clarke . |
| 4,790,954 | 12/1988 | Burba, III et al. . |
| 4,844,164 | 7/1989 | Shen ................... 166/292 X |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. ...................... 166/293 |
| 5,026,215 | 6/1991 | Clarke . |
| 5,058,679 | 10/1991 | Hale et al. . |
| 5,082,499 | 1/1992 | Shen ................... 106/735 |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. .................... 106/811 |
| 5,147,565 | 9/1992 | Bour et al. ........................ 252/8.551 |

5,301,752

DRILLING AND CEMENTING WITH PHOSPHATE-BLAST FURNACE SLAG

BACKGROUND OF THE INVENTION

This invention relates to well drilling and cementing operations.

The general procedure of drilling an oil or gas well includes drilling a borehole using a drilling fluid. Subsequent to drilling the borehole, casing is run into the well preparatory to placing a cement in the annulus between the outside of the casing and the borehole wall. In order to obtain a good cementing job it is necessary to displace substantially all of the drilling fluid or mud in the annulus with cement.

This necessity arises from the fact that undisplaced mud and filter cake become a source of unsuccessful cement jobs since drilling fluids and cements are usually incompatible. Undisplaced drilling fluid is not a reliable sealant to isolate zones in the annulus and is not a good structural support for the casing. Thus, most water-based muds will adversely change the setting time and compressive strength of the cement. Also, most cements will flocculate and thicken most water-based muds. As the cement is pumped out of the bottom of the casing and up the annulus, it may form flow channels through blocking sections of flocculated drilling mud. In addition, undisplaced filter cake can prevent cement from bonding to the formation and becomes a source of the flow channels.

The drilling industry has sought to overcome these problems by using a variety of techniques to displace the drilling fluid with cement, e.g., utilization of turbulent flow regimes, casing movement (reciprocal/rotation), casing equipment (centralizers, flow diverters, and mud scratchers), spacers and special wash fluids while cementing, but these have had limited success.

Even wash fluids are incapable of removing all of the filter cake since it is at least partially adhered rather tightly to the wall of the wellbore. In addition, wellbores are frequently irregularly shaped with large sections which become filled with drilling fluid. Fluid occupying such irregularly shaped or enlarged sections is often out of the main fluid flow stream in the borehole and is therefore difficult to remove.

Even greater cementing difficulties are encountered with extended reach boreholes and slim hole wells with major problems arising in connection with running casings, displacement of mud and centralization of the casing due to the restricted annulus. When a poor cementing job results due to these problems it may be necessary to perforate the casing and squeeze cement under high pressure through the perforations into the annulus and try to fill the zones that were not properly cemented initially. Even this may not be successful and can result in eventual abandonment of the hole. For one thing, the drilling mud and filter cake resulting therefrom, and conventional cements are simply not compatible.

In addition, many formations have high calcium ion content which creates problems with drilling fluids.

Finally, disposal of what drilling fluid can be successfully removed from a borehole presents its own problems.

Hence, incompatibility of drilling and cementing fluids remains a problem. Even if, through extraordinary efforts, the compatibility problems are mitigated, a Portland cement composition is rigid and not tolerant of flexing. Also, while generally viewed as a strong, hard substance, in fact Portland cement has limited tensile strength.

SUMMARY OF THE INVENTION

It is an object of this invention to avoid compatibility problems between drilling fluids and cements.

It is a further object of this invention to provide compositions for universal fluids which can be used as drilling muds and then be converted to compatible cementitious slurries.

It is a further object of this invention to convert filter cake and/or undisplaced drilling mud to an integral part of a cement.

It is yet a further object of this invention to provide a cement having good adhesion and sufficient ductility to resist cracking on flexing.

It is yet a further object of this invention to allow cementing in a restricted annulus.

It is a further object of this invention to provide a system operable in high calcium ion situations; and It is yet a further object of this invention to avoid disposal problems associated with used drilling muds.

In accordance with this invention there is provided a method for drilling and cementing a well comprising carrying out a drilling operation with a drilling fluid comprising water and a metal oxide which is a proton acceptor, thus laying down a filter cake; thereafter contacting the filter cake with a phosphorus acid to produce a set filter cake; and thereafter introducing a cementitious slurry comprising blast furnace slag into a wellbore to perform a cementing operation.

In accordance with another embodiment of this invention there is provided a method for drilling and cementing a well comprising carrying out a drilling operation with a drilling fluid comprising water and blast furnace slag which serves as a metal compound which is a proton acceptor, thereafter combining the thus-used drilling fluid with a phosphorus acid to produce a cementitious slurry and thereafter introducing the cementitious slurry into a wellbore to perform a cementing operation.

DETAILED DESCRIPTION OF THE INVENTION

The present invention utilizes a two-component system. The first component is a metal compound and the second component is a phosphorus acid.

Metal Compound

By 'metal compound' is meant a proton acceptor metal compound which will react with a phosphorus acid to give a water-insoluble salt. By 'water-insoluble salt' is meant a solubility in water of less than 0.01 parts by weight per 100 parts by weight of water. Preferred metal compounds are those that are insoluble in water and have a specific gravity of at least 3.0, preferably 3.5. By 'insoluble' is meant having a solubility in cold (room temperature) with water of less than 0.01 parts by weight per 100 parts by weight of the water. Preferred insoluble compounds are metal oxides such as CaO, MgO and ZnO. The preferred metal oxides are magnesium oxide and zinc oxide, and most preferably, magnesium oxide. The applicable metal oxides are generally fired at temperatures above 1,000° F. for several hours to reduce chemical activity prior to grinding to a final particle size for use in reacting with the polymer component. Generally, the metal compound component will have a particle size such that it exhibits a surface area within the range of 500 to 30,000 cm²/g, preferably 1500 to 25,000 cm²/g, most preferably 2000 to 20,000 cm²/g.

Phosphorus Acid

By 'phosphorus acid' is meant phosphonic acids and phosphoric acids including water-soluble or water-dispersable polyphosphoric acids and their water-soluble or water-dispersable salts. The term polyphosphoric acid is meant to encompass both linear and cyclic polyphosphoric acids.

Linear phosphoric acids can be depicted by the general formula $H_{n+2}P_nO_{3n+1}$ where n is 1 to 100, preferably 2 to 50, more preferably, 2 to 20. Examples include di(pyro)phosphoric acid, tri-(tripoly)phosphoric acid, tetraphosphoric acid and higher molecular weight polyphosphoric acids as well as phosphoric acid. Mixtures of acids, including those traditionally referred to as meta phosphoric acid, are particularly suitable for use in this invention. A preferred group of these can be represented by the following formula:

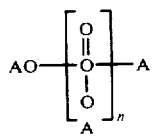

where A is selected from H and $NH_4$. The n can be 1 to 100, preferably 2 to 10, most preferably 2 to 5.

The formation of one phosphate cement using a metal oxide as the metal compound can be depicted as follows:

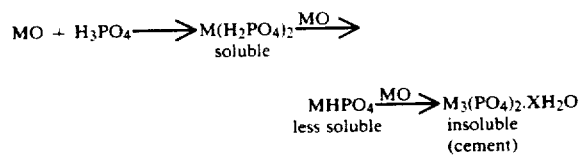

where:
X is usually 4; and
MO = metal oxide which is a proton acceptor.

As used herein, the term "universal fluid" means a composition suitable for drilling which also contains components possessing cementitious potential, which on subsequent combination with a second component, forms a cementitious slurry.

By 'cementitious slurry' is meant an aqueous slurry which will harden to a solid, i.e., a cement.

The phosphorus salts used in this invention are thus the reaction product of the metal compound which serves as the cementitious component and the phosphorus acid component.

The phosphorus acid component is used in a stoichiometric amount or less since an excess of acid should generally be avoided. From 1 to 10 or even to 50 mole percent less than a stoichiometric amount is suitable, generally, a stoichiometric amount between 10 and 100 wt. % based on the weight of the metal compound.

Drilling Fluids

The term 'drilling fluid' as used herein means water-based or oil-based fluids which contain water, a proton acceptor metal compound and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

As used herein the reference to 'water-based drilling fluids' is meant to encompass those drilling fluids having a continuous water phase including fresh water fluids and salt water fluids which may be made from seawater or man-made brine solutions. The water-based fluids can be either essentially pure water or can contain up to 50% oil, i.e., oil in water emulsions.

It is sometimes desired that the water-based drilling fluids use water containing dissolved salts, particularly sodium chloride. In these instances, 0.1 to 26 wt. %, preferably 3 to 10 wt. % sodium chloride may be used. One suitable source is to use seawater or a brine solution simulating seawater. Various salts, preferably organic salts, are suitable for use in the drilling fluid used in this invention in addition to, or instead of NaCl, including, but not limited to, $NaBr$, $KCl$, $CaCl_2$, $NaNO_3$, $NaC_2H_3O_2$, $KC_2H_3O_2$, $NaCHO_2$ and $KCHO_2$ among which sodium chloride is preferred, as noted above. Broadly, the salts can be used, if desired, in an amount up to the saturation point under the conditions employed.

The amount of metal compound initially present in the drilling fluid can vary widely; generally 1–600 lbs/bbl, preferably 100–500 lbs/bbl, most preferably 150–250 lbs/bbl are used. By 'bbl' is meant barrels of total drilling fluid. The total amount of metal compound in the cementitious slurry may be the same as in the drilling fluid or additional metal compound can be added. If no additional metal compound is added, the amount based on the barrels of cementitious fluid is actually less due to the addition of the polymer.

Because of the mass provided by the metal compound component of the ionomer, these components can actually be heavier than most conventional drilling fluids. This provides distinct advantages since a smaller amount of the material can be used and still achieve a final density which is suited to the particular formation in question. Second, because of the high density, it is sometimes possible to operate without weighting agents such as barium sulfate (barite).

Another advantage which is of particular importance in some applications is the flexibility concerning the setting time. With a true hydraulic cementitious component, some degree of hardening begins to occur immediately upon contact with water due to hydrolysis. With the phosphorus salt, the drilling fluid can be stored or used indefinitely and does not begin to set until the second component is added. Even more significantly in some applications is the control over setting time. Even with activators, there is a limit on how quickly Portland cement, for instance, can be caused to set which is a severe limitation in cementing operations where the cementitious slurry is leaching away into thief zones. It is also a serious limitation in non-oilfield applications such as road and airfield repair and building construction where quick setting times are desirable. With the systems of the invention setting times of as little as one minute are possible. Yet, with appropriate retarders, the setting times can be adjusted to be similar to those of cementitious slurries made with a material such as Portland cement. Thus, there is a wider degree of flexibility possible with the compositions of this invention. Suitable retarders include boric acid and borate salts and aluminates such as sodium aluminate. These can be used in an amount within the range of 1 to 100% by weight based on the weight of phosphorus acid.

The compositions of this invention offer the further advantage in drilling operations utilizing as the aggregate, in effect, the drilling mud, thus avoiding the necessity for disposing of large quantities of drilling mud. Finally, the compositions, even though made from a drilling mud which is normally regarded as a poor aggregate for Portland cement, have adequate compressive strength and greatly superior tensile strength and ductility as compared with Portland cement or cements made with slag, pozzolans, or other siliceous cements.

Another advantage of this invention in drilling fluid applications is the ability to constitute a drilling fluid wherein most or all of the components also have a cementitious function. This contrasts with Portland cement cementing where most of the components of the drilling fluid have an adverse effect on the cement. The following Table illustrates the uniqueness of such formulations.

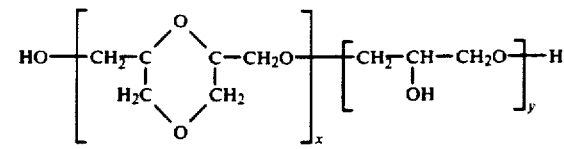

where $x \geq 1$ and $y \geq 0$.

A more complete description of these polycyclicpolyetherpolyols is found in the Hale and Cowan patent, U.S. Pat. No. 5,058,679 (Oct. 22, 1991), referred to hereinabove, the disclosure of which is incorporated herein by reference.

PECP also reduces the friction coefficient of muds on casing and filter cake, and pullout forces required to release stuck pipe are dramatically reduced with PECP in the drilling fluid.

However, compositions of this invention containing the above-described alcohols have the property of being even more tolerant of solids concentrations. Thus, it is possible to operate the drilling operation utilizing the drilling fluid and thereafter add the phosphorus acid

TABLE A

| | Function | | | |
|---|---|---|---|---|
| | Drilling Fluid | | Cementitious Slurry | |
| Additive | Primary Secondary | Secondary | Primary | |
| Synthetic[1] Polymer | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |
| Carbohydrate[4] Polymer | Deflocculant | — | Deflocculant | — |
| Barite[5] | Density | — | Density | Solids |
| Bentonite[6] | Fluid loss control | — | Fluid loss control | Solids |
| Clay/Quartz[7] Dust | — | — | Solids | — |
| Metal Compound[8] | Density | Solids | Cement Component | Solids |
| Phosphorus Acid | Not present | Not present | Cement Component | — |
| Lime[9] | Cuttings/wellbore stabilizer | Alkalinity | Accelerator | Solids |
| PECP[10] | Shale stabilizer | Fluid loss | Rheological control | — |
| NaCl | Shale stabilizer | — | — | — |

[1]Synthetic polymer manufactured by SKW Chemicals Inc. under trade name "POLYDRIL" for instance.
[2]Starch made by Milpark Inc. under the trade name "PEMALOSE" for instance.
[3]"BIOZAN", a biopolymer made by Kelco Oil Field Group, Inc., for instance.
[4]Water-soluble carbohydrate polymer manufactured by Grain Processing Co. under the trade name "MOR-REX" for instance.
[5]Barite is $BaSO_4$, a drilling fluid weighting agent.
[6]Bentonite is clay or colloidal clay thickening agent.
[7]Clay/quartz solid dust manufactured by MilWhite Corp. under trade name "REVDUST" for instance.
[8]MgO for instance.
[9]CaO
[10]Polycyclicpolyetherpolyol The material in the above Table A labeled PECP is of special significance in connection with this invention. This refers to a polyhydric alcohol, most preferably a polycyclicpolyetherpolyol. A general chemical composition formula representative of one class of these materials is as follows:

second component without diluting the drilling fluid. While the drilling fluid may be diluted for the purpose of adjusting density during or prior to the addition of the second component, such dilution is not necessary to avoid unacceptable viscosity increases. Again, it is possible that in some instances it will be desirable to prepare drilling fluid containing only a portion of the total metal compound component, to carry out the drilling operation, dilute the fluid (optional), add the remainder of the metal compound component and simultaneously or thereafter add the acid components and utilize the cement for its intended purpose such as setting a casing.

Cementing

The metal compound can be used as the sole cementitious material in the final cementitious slurry or can be used in admixture with hydraulic materials such as blast furnace slag or Portland cement. In one particularly advantageous aspect of this invention, a siliceous material such as Portland cement or blast furnace slag is used as the source of the metal compound. Thus, in effect, a mixture of cementitious materials is produced in situ.

The cementitious composition of this invention is of particular value for filling and sealing the annulus between a borehole wall and a casing or between casings, particularly where some degree of ductility and/or tensile strength is desired. The ionomer has good adhesive properties to the borehole wall and casing and has greater elasticity than is obtained with siliceous hydraulic materials. With polyvalent metal compounds a cross-linked network can result from the addition of the second component. Thus, such cements are resistant to cracking under conditions of cyclic loading as are frequently encountered in a wellbore. For similar reasons, the metal compound cementitious composition of this invention is beneficial in cementing liners and tieback casing strings which may otherwise leak due to changes in pressure and temperature in the well during production operations.

Another area where the ductility of the phosphorus salt cement is of special value is in slim hole wells where the annulus is smaller. For instance, the invention is of particular utility where part or all of the annulus between the borehole and a casing is 0.25 inch to 1 inch. Still yet another area where this ductility is important is in extended reach drilling. The term 'extended reach' is intended to cover horizontal drilling and any other well drilling operations which are off-vertical a sufficient amount to cause the casing to be displaced by gravity toward one side of the borehole.

In accordance with one aspect of this invention, there is provided a method for drilling and cementing a well comprising preparing a universal fluid by mixing a well fluid or drilling mud and an insoluble metal compound; drilling a borehole with the universal fluid and laying down a settable filter cake on the walls of the borehole during the drilling of the well; adding the phosphoric or phosphonic second component and introducing the thus. formed cementitious slurry into the wellbore and into an annulus between the wellbore and a casing where it hardens and sets up forming a good bond with the filter cake which in time actually hardens itself because of the migration of the acid second component into the filter cake. Thus, filter cake, rather than presenting an incompatibility problem, becomes an integral part of the cement. In addition, any drilling fluid which has migrated into holes or enlarged sections along the borehole will similarly set into a solid because of the migration of the polymer into such remaining drilling fluid.

Another unique advantage of this invention as it relates to well drilling operations relates to the problems encountered with toleration of calcium ions. Since many cementitious components contain calcium, drilling fluids formulated for use with such cementitious materials must be calcium tolerant. Since the compositions of most embodiments of this invention do not contain any significant amount of calcium ions (when a metal compound other than a calcium compound is used), the compositions can be used in a drilling fluid system which has not had to be tailored to be tolerant of calcium ions, i.e., a calcium ion sensitive drilling fluid. Yet the composition of this invention can be used in a calcium ion environment.

In all instances, the cementitious compositions produced in accordance with this invention can be used in primary cementing and thereafter additional cementitious material of the invention used in secondary or remedial cementing.

By 'blast furnace slag' is meant the hydraulic refuse from the melting of metals or reduction of ores in a furnace as disclosed in Hale and Cowan, U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name 'NEWCEM' by the Blue Circle Cement Company. This slag is obtained from the Bethlehem Steel Corporation blast furnace at Sparrows Point, Md.

A usual blast furnace slag composition range in weight percent is: $SiO_2$, 30-40; $Al_2O_3$, 8-18; CaO, 35-50; MgO, 0-15; iron oxides 0-1; S, 0-2 and manganese oxides, 0-2. A typical specific example is: $SiO_2$, 36-4; $Al_2O_3$, 16.0; CaO, 43.3; MgO, 3.5; iron oxides, 0.3; S, 0.5; and manganese oxides <0.1.

Blast furnace slag having relatively small particle size is frequently desirable because of the greater strength it imparts in many instances to a final cement. Characterized in terms of particle size the term "fine" can be used to describe particles in the range of 4,000 to 7,000 $cm^2/g$. Corresponding to 16 to 31 microns in size, "microfine" can be used to describe those particles in the 7,000 to 10,000 $cm^2/g$ range that correspond to particles of 5.5-16 microns in size, and "ultrafine" can be used to describe particles over 10,000 $cm^2/g$ (Blaine specific surface area in all cases) that correspond to particles 5.5 microns and smaller in size.

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt. % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the microfine or ultrafine range. Thus, only a minority, i.e., as little as 4 wt. % of the slag, would need to be ground to the ultrafine particle size. Generally, 5 to 25%, more preferably 5 to 8% can be ground to the ultrafine particle size; the remainder can be ground in the normal way, thus giving particles generally in a size range of greater than 11 microns, the majority being in the 11 to 31 micron range.

Small particle size blast furnace slag is available from Blue Circle Cement Company, from Geochem under the trade name "MICROFINE MC 100", and from Koch Industries, Tulsa, Okla. The Koch product has a Blaine specific surface area of 10,040 and is sold under the trade name "WELL-CEM".

Another feature of this invention is the ability to tailor the rheology of both the drilling fluid and the final cement to the conditions of a particular wellbore. This results from the fact that the use of a metal compound as the hydraulic material gives a final cementitious slurry which is not weakened in the manner that would be the case with Portland cement if the slurry is more dilute. On the other hand, additional metal compound does not impart extremely high viscosity to the slurry and thus a higher concentration of hydraulic material can be used if desired.

Dilution

However, in the preferred method of carrying out this invention, the drilling fluid is utilized and thereafter diluted prior to or during the addition of the polymer. Thus, a significant improvement in the operating procedure is provided. This is because the density of the drilling fluid can be chosen in the first place to be sufficient to avoid inflow into the wellbore because of formation pressure but insufficient to rupture the wellbore wall and force fluid out into the formation. Also the concentration can be chosen to give the desired rheology for drilling. By utilizing the dilution and thereafter the addition of the polymer, the cementitious slurry can likewise have the density and/or rheology tailored to the particular operation. The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the dilution fluid added "on the fly" to the flowing stream. Thereafter, the additional metal compound is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

The diluent can be the same or different from the liquid used to make the drilling fluid. In one embodiment, both are brine solutions such as seawater. The cementitious compositions of this invention do not suffer the kind of property deterioration from the presence of brine that Portland cement does. The brine tolerance can be a major asset in applications such as offshore drilling where fresh water is not available but brine is.

The unique advantage of universal fluids is that wellbore stabilization, fluid-loss control, and cuttings transport can be realized essentially the same as with conventional drilling fluid systems. However, with the simple presence of the phosphorus acid in the subsequent cementitious slurry, the resulting mud-metal compound system will develop strength. Thus, for instance, (1) drilling fluid filter cake deposited while drilling over permeable zones can be converted into an effective sealant by diffusion of activators from the mud-metal compound column; and (2), whole mud that has not been removed from washed-out sections of the hole during displacement will harden with time and, therefore, provide an effective sealant and lateral support to the casing.

In areas such as extended reach and slim hole drilling, the metal compound universal fluid gives the process benefit of avoiding the removal of an incompatible drilling mud and the product benefit of being resistant to deflection when set.

Process and apparatus used to drill and cement are well known. One example can briefly illustrate typical practice as follows. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. When the drilling is complete, the drill string is withdrawn from the wellbore. A first section of well casing, generally having a float shoe with an upper sealing surface, is inserted into the wellbore. Additional sections of casing are generally attached sequentially to the first section and the first section is inserted further into the wellbore.

In accordance with one embodiment of this invention, additional drilling fluid, containing additives necessary to form a cementitious slurry, is pumped down the casing. This may be facilitated by inserting a bottom plug into the casing string, the bottom plug having a longitudinal passage and a rupturable diaphragm at the top, so that it is forced down the casing by he cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In accordance with another embodiment of this invention, the use of these conventional plugs for separating the cementitious slurry from the drilling fluid is generally not necessary. In this embodiment the drill string is simply removed, a casing inserted, and the cementitious slurry circulated into the borehole and up the annulus through direct contact by the displacement fluid, thus also eliminating the need for plugs and the landing collar. The above descriptions are set out in terms of a casing but would be equally applicable to a liner. The term 'pipe' is used herein to describe a hollow member disposed in a wellbore, whether a casing or a liner.

In yet another related embodiment of this invention, universal fluid is utilized in a drilling operation and thereafter the second component (and, optionally, additional cementitious material and/or additives), is gradually added so as to gradually transition the circulating material from a drilling fluid to a cementitious slurry.

Filter Cake Setting

In yet another embodiment of this invention the drilling process is carried as described hereinabove with a universal fluid to produce a borehole through a plurality of strata thus laying down a filter cake. Prior to the cementing operation the second component (phosphorus acid) is passed into contact with the filter cake, for instance by circulating the second component down the drill string and up the annulus between the drill string and the filter cake, or else the drill string is removed and the casing inserted and the second component circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drill string is removed, and the cementing carried out as described hereinabove. This can be accomplished by adding the second component to the drilling fluid.

Conventional spacers may be used in the above described sequence. Also, any left over fluid having phosphorus acid therein may be displaced out of the borehole by the next fluid and/or a spacer fluid and stored for subsequent use or disposal.

In accordance with one embodiment of this invention, the cement slurry can simply be forced down the casing by means of the universal fluid with which it is compatible.

In another embodiment of this invention, drilling is done using a drilling fluid containing a metal compound to lay down a filter cake which is preferably set as described above and thereafter the cementing is done with a cementitious slurry comprising blast furnace slag, water and an accelerator. Also, the use of blast furnace slag as described above for the metal compound source is applicable in this embodiment. Thus, a phosphorus salt can be formed as filter cake followed by cementing with blast furnace slag.

Mixed Metal Hydroxide

Mixed metal hydroxides can be used in the drilling fluid to impart thixotropic properties. In such instances, a thinner such as a lignosulfonate is preferably added before adding acid. The mixed metal hydroxides provide better solids suspension. This, in combination with the settable filter cake provided in the technique of this invention greatly enhances the cementing in a restricted annulus, for instance.

The mixed metal hydroxides are particularly effective in muds containing clay such as sodium bentonite in addition to the metal oxide. Preferred systems thickened in this way contain from 1–20 lbs/bbl of clay such as bentonite, preferably 2–15 lbs/bbl, most preferably 7 to 12 lbs/bbl. The mixed metal hydroxides are generally present in an amount within the range of 0.1 to 2 lbs/bbl of drilling fluid, preferably 0.1 to 1.5 lbs/bbl, most preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula

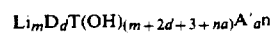

$$Li_m D_d T(OH)_{(m+2d+3+na)} A'_a{}^n$$

where m represents the number of Li ions present; the said amount being in the range of zero to about 1;

D represents divalent metals ions; with d representing the amount of D ions in the range of zero to about 4;

T represents trivalent metal ions;

A" represents monovalent or polyvalent anions of valence $-n$, other than $OH^-$, with a being the amount of A' anions; and where $(m+2d+3+na)$ is equal to or greater than 3.

A more detailed description can be found in Burba, U.S. Pat. No. 4,664,843 (May 12, 1987).

The mixed metal hydroxides in the drilling fluids in combination with the blast furnace slag tend to set to a cement having considerable strength in a comparatively short time, i.e., about one-half hour at temperatures as low as 100° F. This can be a major asset in some applications.

Conventional Drilling Fluid Additives

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

EXAMPLE 1

Base Mud: Fresh water mud containing bentonite, chrome lignosulfonate, and low viscosity polyanionic cellulose 300 lbs of hard brned magnesium oxide, under the trade name of "MAGCHEM 10 CR" by Martin Marietta Magnesia Specialties was added to weight the base mud up to 12.6 lbs/gal. Varying amounts of an ammonium polyphosphate solution were added to solidify the mud. The ammonium polyphosphate solution used is "POLY-N" sold by Arcadian Corporation and contains about 50 wt. % ammonium polyphosphate. The results are described in the following table.

| Amount of Poly-N Added, % by volume of the mud | Resulting Density lbs/gal | Description of the resulting solid |
|---|---|---|
| 0 | 12.6 | Did Not Set |
| 25 | 12.4 | Set, resilient 50 psi after 4 hrs |
| 50 | 12.3 | Set, resilient 40 psi after 4 hrs |
| 100 | 12.2 | Set, resilient 30 psi after 4 hrs |

This example shows that solutions of polyphosphates can be used as diluents while also converting the drilling fluid into a solid.

EXAMPLE 2

Base Mud: Fresh water mud containing bentonite, chrome lignosulfonate, and low viscosity polyanionic cellulose 300 lbs of hard burned magnesium oxide, under the trade name of "MAGCHEM 10 CR" by Martin Marietta Magnesia Specialties was added to weight the base mud up to 12.6 lbs/gal. Varying amounts of a monoammonium phosphate were added to solidify the mud. The results are described in the following Table.

| Amount of MAP Added, % by wt of MgO of the mud | Resulting Density lbs/gal | Description of the resulting solid |
|---|---|---|
| 0 | 12.6 | Did Not Set |
| 25 | 12.6 | Set, resilient 50 psi after 4 hrs |
| 50 | 12.7 | Set, resilient 250 psi after 2 hrs |
| 100 | 12.85 | Set, hard 510 psi after 2 hrs |

While this invention has been described in detail for the purpose of illustration, it is not be construed as limited thereby but is intended to cover all changes and modifications within the spirit and scope thereof.

What is claimed is:

1. A method for drilling and cementing a well, comprising:
   combining constituents comprising water and blast furnace slag which serves as a proton acceptor metal compound to produce a drilling fluid;
   thereafter utilizing said drilling fluid in a well drilling operation to form a borehole, thus producing a used drilling fluid;
   thereafter combining said used drilling fluid with phosphorus acid to produce a cementitious slurry; and
   utilizing said cementitious slurry in a cementing operation.

2. A method according to claim 1 wherein said phosphorus acid is used in a stoichiometric amount.

3. A method according to claim 1 wherein said cementitious slurry is passed down said borehole and up into an annulus formed by said borehole and a casing to effect primary cementing.

4. A method according to claim 2 wherein said drilling fluid comprises, in addition, a polycyclicpolyetherpolyol.

5. A method according to claim 1 wherein a metal oxide compound is combined with said used drilling fluid.

6. A method according to claim 1 wherein said water contains dissolved solids.

7. A method according to claim 6 wherein said water is seawater.

8. A method according to claim 1 wherein said drilling fluid contains mixed metal hydroxides.

9. A method according to claim 1 wherein said blast furnace slag has an ultrafine particle size.

10. A method according to claim 1 wherein said phosphorus acid is selected from the group consisting of ammonium polyphosphate and monoammonium phosphate.

11. A method for drilling and cementing a well having a restricted annulus, comprising:
   combining constituents comprising water and blast furnace slag which serves as a proton acceptor metal compound to produce a drilling fluid;
   thereafter utilizing said drilling fluid in a well drilling operation to form a borehole, thus producing a used drilling fluid;
   thereafter combining said used drilling fluid with a phosphorus acid to produce a cementitious slurry; and
   utilizing said cementitious slurry in cementing said restricted annulus.

12. A method according to claim 11 wherein said phosphorus acid is used in a stoichiometric amount.

13. A method according to claim 11 wherein said well drilling operation is a slim hole drilling operation.

14. A method according to claim 11 wherein said well drilling operation is an extended reach drilling operation.

15. A method according to claim 11 further comprising combining a oxide metal compound with said used drilling fluid.

16. A method for drilling and cementing a well, comprising:
   combining constituents comprising water and a proton acceptor metal compound to produce a drilling fluid;
   thereafter utilizing said drilling fluid in a well drilling operation to form a borehole, thus laying down a filter cake and producing a used drilling fluid;
   contacting said filter cake with a phosphorus acid to produce a set filter cake;
   disposing a pipe in said borehole;
   passing a cementitious slurry comprising water, blast furnace slag and an activator into said pipe; and displacing said cementitious slurry out of said pipe and up into an annulus surrounding said pipe with a displacement fluid.

17. A method according to claim 16 wherein said displacement fluid is seawater.

18. A method according to claim 16 wherein said metal compound is magnesium oxide and said phosphorus acid is selected from the group consisting of ammonium polyphosphate and monoammonium phosphate.

* * * * *